United States Patent [19]

Turner et al.

[11] Patent Number: 5,074,681
[45] Date of Patent: Dec. 24, 1991

[54] DOWNHOLE MOTOR AND BEARING ASSEMBLY

[75] Inventors: William E. Turner, Middlefield; Lynn M. Lee, East Hampton, both of Conn.; Mark D. Zitka, Lafayette, La.

[73] Assignee: Teleco Oilfield Services Inc., Meriden, Conn.

[21] Appl. No.: 641,665

[22] Filed: Jan. 15, 1991

[51] Int. Cl.$^5$ .................... E21B 4/00; F16C 19/02
[52] U.S. Cl. .................... 384/613; 175/107; 384/611
[58] Field of Search .............. 384/91, 93, 126, 452, 384/455, 613, 611; 175/107

[56] References Cited

U.S. PATENT DOCUMENTS

| 2,348,046 | 5/1941 | Yost . | |
|---|---|---|---|
| 2,353,534 | 5/1941 | Yost . | |
| 3,449,030 | 6/1969 | Tiraspolsky et al. . | |
| 3,834,818 | 7/1975 | Tschirky | 418/48 |
| 3,840,080 | 10/1974 | Berryman | 175/107 |
| 3,857,655 | 12/1974 | Tschirky | 418/48 |
| 3,912,425 | 10/1975 | Tschirky et al. | 418/48 |
| 3,912,426 | 10/1975 | Tschirky et al. | 418/48 |
| 3,982,797 | 9/1976 | Tschirky et al. . | |
| 4,086,788 | 5/1978 | Garrison . | |
| 4,098,561 | 7/1978 | Tschirky et al. | 418/48 |
| 4,114,702 | 9/1978 | Maurer et al. | 175/107 |
| 4,114,703 | 9/1978 | Matson, Jr. et al. | 175/107 |
| 4,114,704 | 9/1978 | Maurer et al. | 175/107 |
| 4,116,451 | 9/1978 | Nixon et al. | 277/116 |
| 4,135,772 | 1/1979 | Stodt . | |
| 4,185,704 | 1/1980 | Nixon, Jr. | 175/76 |
| 4,187,918 | 2/1980 | Clark | 175/107 X |
| 4,198,104 | 4/1980 | Crase . | |
| 4,199,201 | 4/1980 | Trzeciak . | |
| 4,220,380 | 9/1980 | Crase et al. | 175/107 X |
| 4,221,552 | 9/1980 | Clark | 418/48 |
| 4,225,000 | 9/1980 | Maurer | 175/107 |
| 4,240,683 | 12/1980 | Crase . | |
| 4,246,976 | 1/1981 | McDonald, Jr. | 175/107 |
| 4,260,202 | 4/1981 | Crase et al. . | |
| 4,324,299 | 4/1982 | Nagel | 175/107 |
| 4,329,127 | 5/1982 | Tschirky et al. | 418/48 |
| 4,340,334 | 7/1982 | Nixon | 415/172 A |
| 4,397,619 | 8/1983 | Alliquander et al. | 418/48 |
| 4,410,054 | 10/1983 | Nagel et al. | 175/107 |
| 4,729,675 | 3/1988 | Trzeciak et al. | 384/613 |

FOREIGN PATENT DOCUMENTS

1122200 4/1982 Canada .

Primary Examiner—Thomas R. Hannon
Attorney, Agent, or Firm—Fishman, Dionne & Cantor

[57] ABSTRACT

A downhole motor includes a bearing assembly for allowing rotational and bidirectional axial movement of a drive shaft in a housing. The bearing assembly includes a stationary race member, a displaceable race member, ball bearings disposed between the race members, and resilient load carrying members for distributing axial thrust loading from the drive shaft to the displaceable race member when the drive shaft is axially displaced in a first direction. The bearing assembly further includes resilient preload members for maintaining the ball bearings in contact with the race members in the absence of axial loading and when the drive shaft is axially displaced in a second direction. The downhole motor of the present invention provides a high axial thrust load capacity, prevents shock loading on the bearing assembly during sudden changes in the direction of axial loading on the bearing assembly and exhibits improved durability during cyclic bidirectional axial thrust loading.

30 Claims, 4 Drawing Sheets

DOWNHOLE MOTOR AND BEARING ASSEMBLY

BACKGROUND OF THE INVENTION

Drilling devices wherein a drill bit is operated by a downhole motor, e.g., a positive displacement fluid motor or a turbine driven motor, are well known. In such motors the drill bit is rotated by a rotor which is turned by flow of fluid, e.g., a flow of drilling fluid through the motor.

U.S. Pat. No. 4,729,675 is directed to a bearing assembly for supporting a rotor drive shaft in a downhole motor. The device described in the '675 patent includes stacked bearings, and bearing sleeve members and springs. The sleeve members may be interchanged to change bearing loading according to the amount of upward or downward thrust imposed on the shaft during the drilling operation. The device described in the '675 patent contemplated thrust loading on a particular arrangement of bearings and sleeve from only one direction; i.e. if a reversal of the direction of loading was anticipated, the bearing assembly was reconfigured to prepare for the new demands on the tool.

Drilling practices have evolved, i.e. current drilling practice imposes higher thrust loads and cyclic, bidirectional axial loading on a downhole motor, to the point that the bearing configuration described in the '675 patent is now deficient in several respects, i.e. the bearing configuration is prone to failure due to broken or chipped balls, cracked springs and/or shattered bearing races.

SUMMARY OF THE INVENTION

It is therefore an object of this invention to provide a new and improved bearing assembly for use in downhole motors which overcomes the above deficiencies.

The above stated object, as well as other advantages, are accomplished by the downhole motor of the present invention which includes a tubular housing, a stator secured within the housing, a rotor rotatable within the stator and a drive shaft and bearing assembly for supporting the rotor in the housing.

The bearing assembly includes a stationary race member secured within the housing, a displaceable race member disposed between the housing and the driveshaft and ball bearing means disposed between the respective race members for allowing relative rotation of the race members. The bearing assembly includes resilient load carrying means for distributing axially directed loads from the drive shaft to the rotatable race member and resilient preload means for maintaining an axially directed preload on the displaceable race member to maintain contact between the ball means and the respective race means.

The drilling motor of the present invention provides a high axial thrust load capacity and prevents shock loading of the elements of the bearing assembly during sudden changes in the direction of axial loading on the bearing assembly.

In a preferred embodiment, the resilient load carrying means comprise two opposed stacks of Belleville springs wherein each spring exhibits a load carrying capacity of about 2000 pounds or greater.

In a preferred embodiment, the resilient preload means comprises one or more Belleville springs wherein each Belleville spring has a load carrying capacity of about 1000 pounds or less.

An alternative embodiment of the bearing assembly is also disclosed. The assembly includes a housing, a driveshaft, a stationary race member disposed between the housing and shaft and secured to the housing, a first displaceable race member disposed between the housing and the shaft above the stationary race member and a second displaceable race member disposed between the housing and the shaft and below the race member the assembly includes first and second ball means, disposed between the stationary race member and a respective displaceable race member, for allowing relative rotation of the respective displaceable race members and the stationary race member. The assembly includes first resilient load carrying means for distributing downwardly directed axial loading from the drive shaft to the first displaceable and second resilient load carrying means for distributing upwardly directed loading from the drive shaft to the second displaceable bearing member. The assembly further includes first resilient preload means for maintaining a downwardly directed axial preload on the first displaceable race member and a second resilient preload means for maintaining an upwardly directed axial preload on the second displaceable race member.

A second alternative embodiment of the bearing assembly is also disclosed. The second alternative embodiment includes a housing, a drive shaft, first and second stationary race members each disposed between the housing and shaft, first and second displaceable race members, first and second ball means for allowing rotation of each of the respective displaceable race means relative to the respective stationary race means and first and second resilient load carrying means for distributing upwardly directed loading from the drive shaft to the respective displaceable race members. The resilient load carrying means each comprises two opposed stacks of Belleville springs, each stack comprises a plurality of Belleville springs stacked in parallel. The first and second load carrying means allow the upwardly directed axial load to be evenly shared by the first and second race members and first and second ball means.

DETAILED DESCRIPTION OF THE INVENTION

Figure 1:
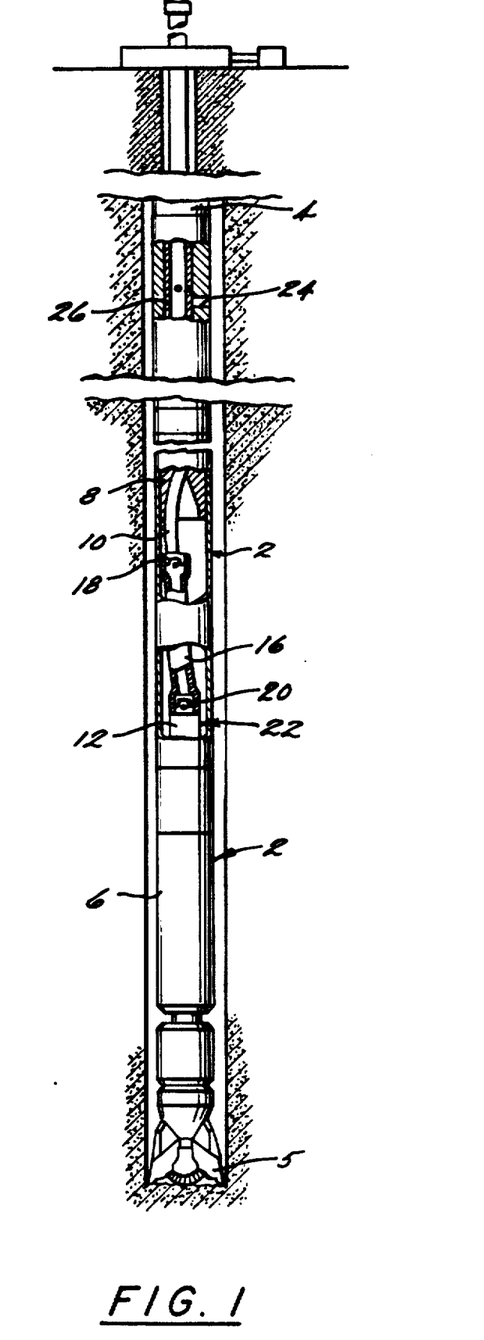
FIG. 1 shows a schematic partially sectioned view of downhole motor assembly for earth drilling.

FIG. 1 shows a schematic view of a drilling motor assembly 2 of the present invention connected between the lower end of a drill pipe 4 and a drill bit 5 and disposed in a borehole. The motor 2 includes a housing 6, a stator 8 secured within the housing 6, a rotor 10 rotatable within the stator 8, a rotatable drive shaft 12 for coupling the rotor 10 to a drill bit 5 and a connecting rod 16 for connecting the rotor to the drive shaft 12.

The stator 8 has a helically contoured inner surface and the rotor 10 has a helically contoured outer surface which together define a positive displacement fluid pump having a helically shaped progressive cavity. The rotor 10 is connected to drive shaft 12 by connecting rod 16 and universal joints 18, 20.

The drive shaft 12 extends downwardly through the housing 6, is supported within the housing 6 by a bearing assembly 22 and is fitted with the drill bit 5 in its lower end. The drive shaft 12 is tubular and defines inlet ports at its upper end and an outlet port is its lower end.

Drilling fluid is pumped through drill pipe 4 to motor 2. Drilling fluid is allowed to either enter motor 2 or to bypass motor 2 through valved bypass ports 24 defined near the top end of the motor 2.

If the drill bit 5 is not in contact with the bottom of the borehole, the rotor 10, connecting rod 16, drive shaft 12 and drill bit 5 are displaced axially downwardly relative to housing 6 and the axially downwardly directed thrust on drive shaft 12 is transferred to housing 6 by bearing assembly 22.

When, as shown in FIG. 1, the drill bit 5 is brought into contact with the bottom of the borehole, the weight of the entire drillstring is imposed on the bit, the drill bit 5, drive shaft 12, connector rod 16 and rotor 10 are displaced axially upwardly relative to housing 6 and the axially upwardly directed thrust on drive shaft 12 is transferred to housing 6 through bearing assembly 22.

During drilling, the bypass ports are closed by shuttle 26 and the drilling fluid is pumped downwardly through the motor 2 to drive rotor 10. Rotor 10 rotates eccentrically within the stator 8 and orbits around the inner surface of the stator 8 in a direction opposite the direction of rotation. The connecting rod 6 and universal joints 18, 20 transmit the rotational movements of rotor 10 to the drive shaft 12 while compensating for the eccentric movements of the rotor 8. Drive shaft 12 rotates concentrically within the housing 6 to drive the drill bit 5. The bearing assembly 22 allows axial displacement of the drive shaft 12 relative to the housing.

The drilling fluid flows through the cavity formed between the rotor 10 and stator 8 through the portion of housing 6 surrounding the connecting rod, into the inlet ports (not shown) provided on drive shaft 12 through drive shaft 12 and out through the outlet port (not shown) to flush cuttings from the borehole and cool the drill bit 5.

Figure 2:
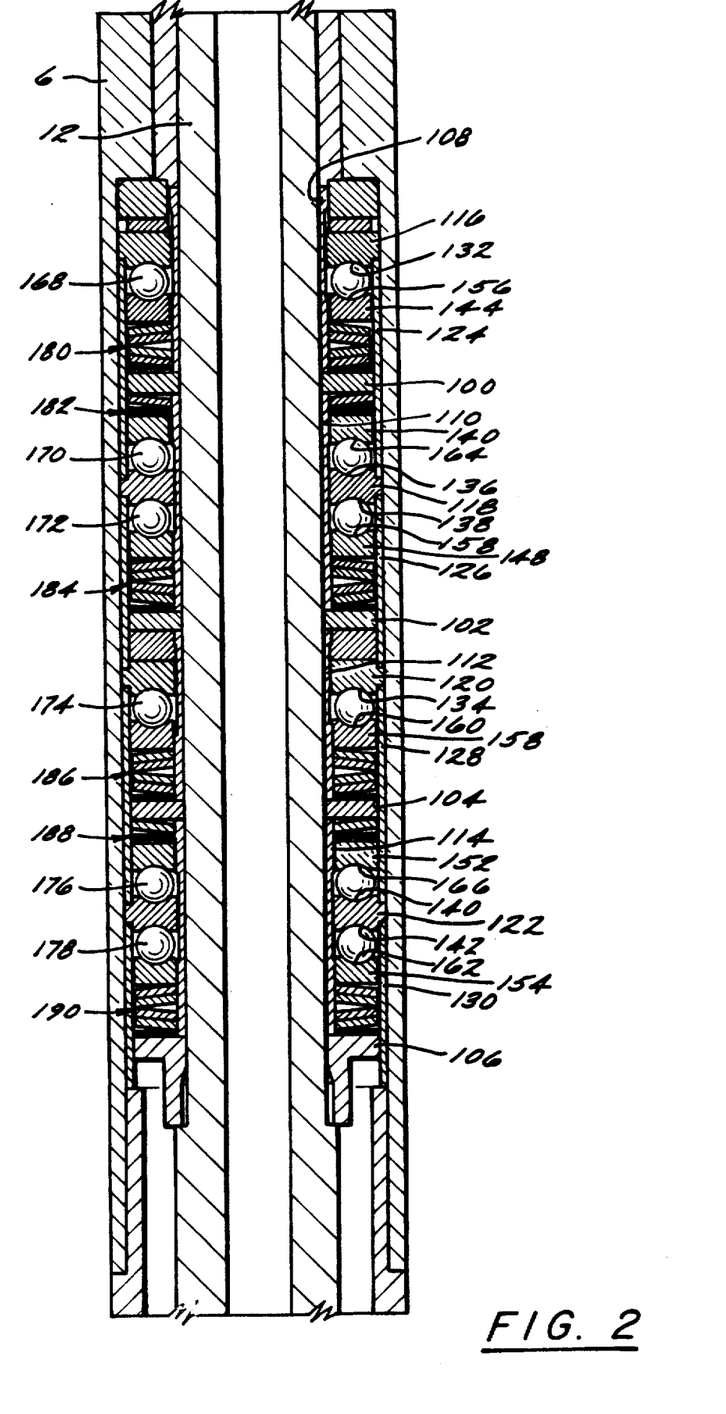
FIG. 2 shows an enlarged, longitudinal cross sectional view of the bearing assembly of FIG. 1.

FIG. 2 shows an enlarged view of the bearing assembly 22 supporting drive shaft 12 in housing 6.

The spring assembly 22 includes a plurality of axially spaced apart spacer rings 100, 102, 104, 106 rotatable with the drive shaft 12 and a plurality of drive shaft sleeve members 108, 110, 112, 114 for maintaining spacer rings 100, 102, 104, 106 in their spaced apart positions. The spring assembly 22 includes a plurality of longitudinally spaced apart stationary race members 116, 118, 120, 122 secured within housing 6 and a plurality of housing sleeve members 124, 126, 128, 130 for maintaining the stationary race members in their spaced apart positions.

Stationary race members 116 and 120 are each single-sided race members each having a ball receiving race 132, 134 defined on their respective lower surfaces.

Stationary race members 118 and 122 are double sided race members having ball receiving races 136, 138 and 140, 142 defined on their respective upper and lower surfaces.

The spring assembly 22 includes a plurality of single sided displaceable race members 144, 146, 148, 150, 152, 154. Race members 144, 148, 150, 154 each define a ball receiving race 156, 158, 160, 162 on their respective upper surfaces. Race members 146 and 152 each define a ball receiving race 164, 166 on their respective lower surfaces.

A plurality of ball bearings 168 are received in the races 132, 156 of stationary race member 116 and displaceable race member 144.

A plurality of ball bearings 170 are received in the race 164, 136 of stationary race member 118 and displaceable race member 146.

A plurality of ball bearings 172 are received in the race 138, 158 of stationary race member 118 and displaceable race member 148.

A plurality of ball bearings 174 are received in the race 134, 160 of stationary race member 120 and displaceable race member 150.

A plurality of ball bearings 176 are received in the race 166, 140 of stationary race member 122 and displaceable race member 152.

A plurality of ball bearings 178 are received in the race 142, 162 of stationary race member 122 and displaceable race member 154.

Belleville spring assemblies 180, 182, 184, 186, 188, 190 are each disposed between a respective spacer ring and displaceable race members.

Each spring assembly 180, 182, 184, 186, 188, 190 includes one or more stiff Belleville springs for distributing axial load from the drive shaft to the ball bearing and race member to assemblies. A particular stiff spring is chosen on an application by application basis in accord with the motor size and the anticipated axial loading to be applied to the bearing assembly. Typically, a stiff spring of the present invention exhibits a stiffness of greater than about 20,000 lb/in. Spring assemblies 180, 184, 186 and 190 are oriented to distribute upwardly directed thrust loads and each includes first and second opposed pairs of stiff Belleville washers. Spring assemblies 182 and 188 are oriented to distribute downwardly directed thrust loads and include a single "stiff" Belleville spring.

A plurality of stiff Belleville springs are stacked in parallel to increase the load carrying capacity of each spring assembly. Since the upwardly directed axial loading applied to the drive shaft 12 during drilling is high, assemblies 180, 184, 186 and 190 each comprise two opposed stacks of two stiff springs to provide the required load capacity. Stacking Belleville springs in parallel increases load carrying capacity while maintaining the same deflection, i.e. compression distance of the spring assembly. Stacking springs in series, i.e. in opposition to each other increases the deflection of the spring assembly. In spring assemblies 180, 184, 186 and 190 the first and second pairs of springs are stacked in opposition to increase the deflection.

The arrangement of stiff Belleville springs used in the present invention provides a high load carrying capacity and a wide range of deflection and reduces the chance of one load carrying spring flattening out before the others and subjecting one set of races and ball bearings to the entire thrust load on the drive shaft.

Each spring assembly 180, 182, 184, 186, 188, 190 includes one or more soft Belleville springs for preloading the bearing assembly to maintain contact between bearings 168-178 and their respective stationary and displaceable race members. A particular soft spring is chosen on an application by application basis to provide a desired preload on associated components of the bearing assembly. It is believed that soft springs having a load capacity of about 300 pounds is sufficient to maintain an adequate preload in most applications. Typically, a soft spring according to the present invention exhibits a stiffness of less than about 5000 lb/in. The soft springs of spring assemblies 180, 184, 186 and 190 apply an upwardly directed preload to race members 144, 148, 150 and 154, respectively. The soft springs of spring assemblies 182 and 188 apply a downwardly directed preload to race members 146 and 152, respectively.

Figure 3:
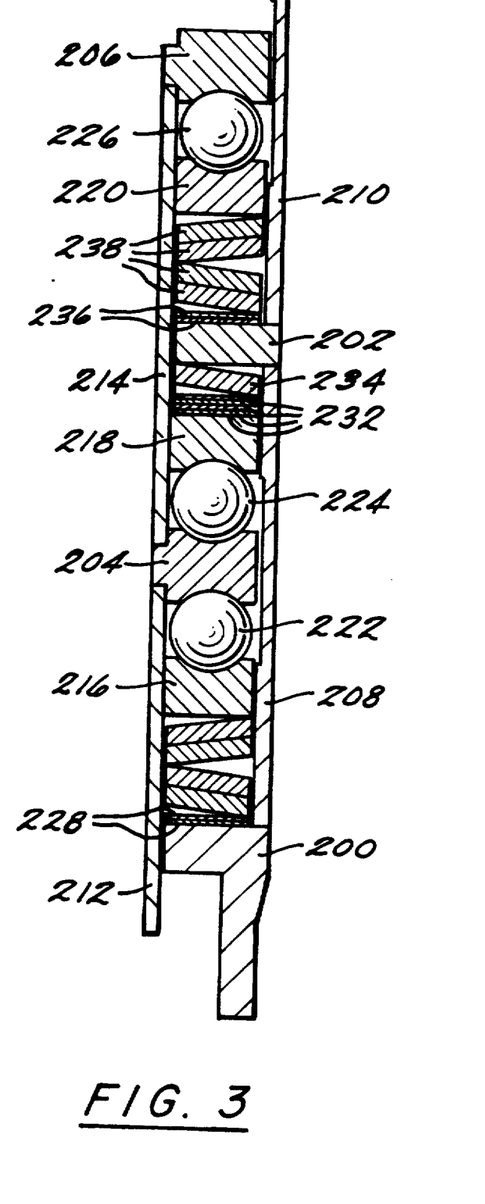
FIG. 3 shows a schematic longitudinal cross sectional view of one half of a downhole motor portion showing a bearing assembly according to the present invention.
Figure 4:
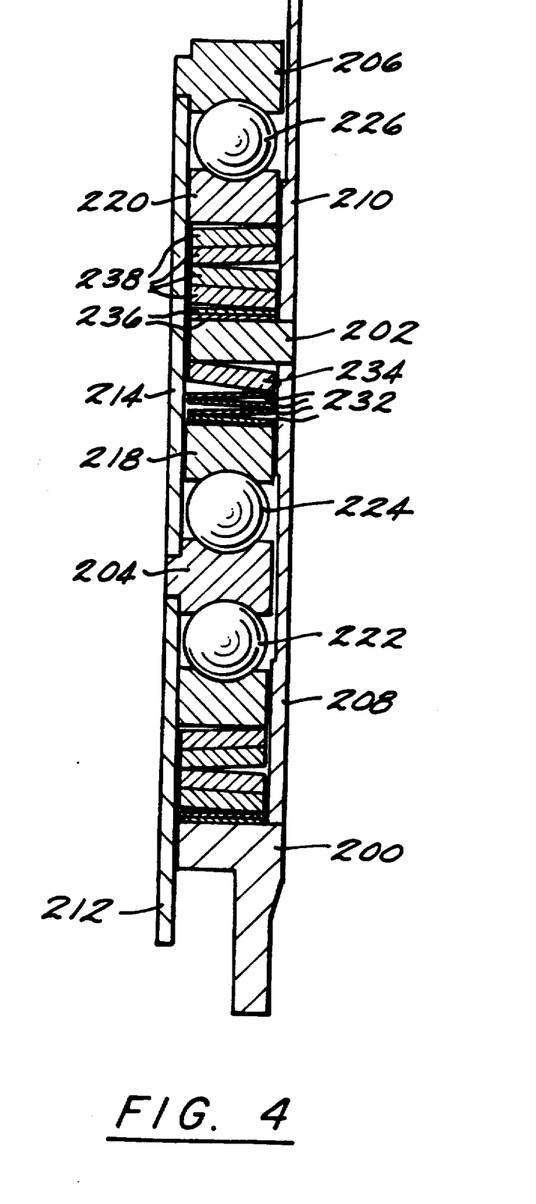
FIG. 4 shows the motor portion of FIG. 3 under the influence of an upwardly directed axial load.

FIGS. 3 and 4 show schematic longitudinal cross sectional views of one half of a bearing assembly of the present invention. The assembly includes a pair of spacer rings 200, 202, each rotatable with a drive shaft (not shown), a double sided stationary bearing race member 204 and a single-sided stationary bearing race member 206, each rotatable with a housing (not shown), a pair of drive shaft sleeve members 208, 210, a pair of housing sleeve members 212, 214, three displaceable race members 216, 218, 220 and ball bearings 222, 224, 226. A pair of soft springs 228, and two opposed pairs of stiff springs 230 is disposed between spacer ring 200 and displaceable race 216. Four soft springs 232 and one stiff spring 234 are disposed between spacer ring 202 and displaceable race member 218. A pair of soft springs 236 and two opposed pairs of stiff springs 238 are disposed between ring 202 and displaceable race member 220.

The soft springs 228, 232, 236 are flattened during assembly as shown in FIG. 3. FIG. 4 shows spring deformation resulting from the application of an axially upwardly directed force to the drive shaft associated with the bearing assembly of FIG. 3. Stiff springs 230 and 238 are compressed by the applied load, while soft springs 232 expand to maintain an axially downwardly directed preload on displaceable race member 218 and ball bearings 224.

The soft springs 228, 232, 236 do not contribute to the load carrying capacity of the bearing assembly. In order to insure that the soft springs 228, 232, 236 remain partially compressed and thus maintain a directed preload on a particular race member even in the extreme case of maximum loading of the bearing assembly in the direction opposite the preload direction, the overall height of the fully expanded, i.e. uncompressed, stack of soft springs must be greater than the overall height of the fully expanded, i.e. uncompressed stack of stiff springs opposed by the stack of soft springs, e.g. the overall height of the fully expanded stack of springs 232 is greater than the overall height of the fully expanded stack of the stiff springs 230. The height criteria is met by stacking soft springs in series.

Figures 5, 6:
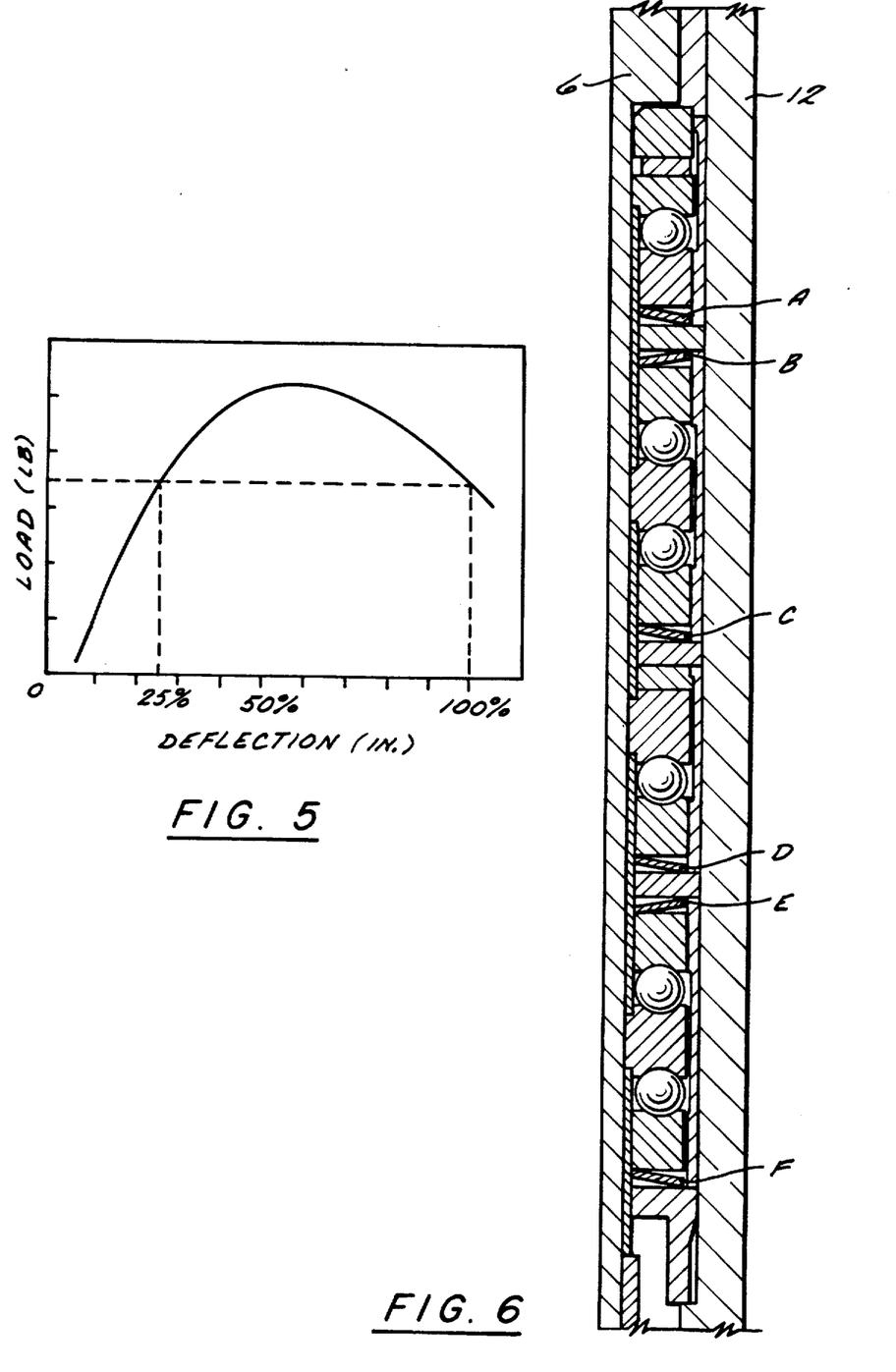
FIG. 5 shows a plot of deflection vs load for a soft Belleville spring.
FIG. 6 shows a schematic view of a prior art downhole motor bearing assembly.

The soft springs exhibit a nonlinear relationship deflection vs load as shown in FIG. 5 and provide a progressive loading, i.e. the preload provided by the soft springs is maintained within a relatively narrow range over a very wide range of spring deflection, so that the preload on the ball bearings remains substantially equal to its initial value regardless of spring deflection.

The soft springs prevent shock loading of the elements of the bearing assembly 22 during changes in the direction of thrust loading and compensate for wear on the elements of the bearing assembly.

EXAMPLE

The performance of a bearing assembly corresponding to the embodiment of the present invention shown in FIG. 2 was compared to that of a bearing assembly according to U.S. Pat. No. 4,729,675 (shown schematically in FIG. 6).

Each of the bearing assemblies was assembled using an 8 inch outer diameter motor housing wherein windows were cut in the housing and sleeves to partially expose the spring assemblies. Each of the bearing assemblies were secured in a test fixture and loaded in the upward, i.e. weight on bit, direction. Measurements of the heights of the spring assemblies were taken at 5000 pound increments as the total applied load was increased. The bearing assembly of the '675 patent was loaded to its maximum load rating of 35,000 pounds, while the bearing assembly of the present invention was loaded to 75,000 pounds, less than its maximum load rating of 89,500 pounds.

Springs A-F of the embodiment of the '675 patent each had an outer diameter of 6.500 inches, an inner diameter of 3.922 inches, a thickness of 0.2200 inch, a dish height of 0.2000 inch and a maximum load capacity of 11,140 pounds.

Springs A, C, D and F were oriented to distribute upwardly directed loads and springs B and E were oriented to distribute downwardly directed loads.

TABLE I shows measured spring height, calculated spring loading Δ, i.e. change in, spring loading vs total applied load for the bearing assembly of the '675 patent.

TABLE II shows the measured spring assembly height, calculated spring assembly loading and calculated Δ spring assembly loading vs total applied load for the bearing assembly of the present invention.

In each of the Tables the Δ loading column denotes the change in calculated load on a particular spring or spring assembly at a particular total applied load from the calculated load on that spring or spring assembly at the next highest total applied load, i.e. at a total applied load that is 5000 pounds less than the particular applied load.

TABLE I

| SPRING | HEIGHT | LOAD | Δ LOAD |
|---|---|---|---|
| APPLIED LOAD: 0 | | | |
| A | .428 | LOOSE | |
| B | .435 | LOOSE | |
| C | .430 | LOOSE | |
| D | .428 | LOOSE | |
| E | .428 | LOOSE | |
| F | .420 | LOOSE | |
| APPLIED LOAD: 5,000 | | | |
| A | .410 | 982 | +982 |
| B | .450 | LOOSE | — |
| C | .415 | 500 | +500 |
| D | .420 | -0- | — |
| E | .435 | LOOSE | — |
| F | .400 | 1899 | +1899 |
| APPLIED LOAD: 10,000 | | | |
| A | .405 | 1499 | +517 |
| B | .460 | LOOSE | — |
| C | .405 | 1499 | +999 |
| D | .415 | 500 | +500 |
| E | .445 | LOOSE | — |
| F | .390 | 2754 | +855 |
| APPLIED LOAD: 15,000 | | | |
| A | .380 | 3551 | +2052 |
| B | .470 | LOOSE | — |
| C | .395 | 2334 | +835 |
| D | .390 | 2754 | +2254 |
| E | .450 | LOOSE | — |
| F | .370 | 4292 | +1538 |
| APPLIED LOAD: 20,000 | | | |
| A | .370 | 4292 | +741 |

TABLE I-continued

| | | | |
|---|---|---|---|
| B | .485 | LOOSE | — |
| C | .390 | 2754 | +420 |
| D | .375 | 3928 | +1174 |
| E | .470 | LOOSE | — |
| F | .360 | 4981 | +689 |
| APPLIED LOAD: 25,000 | | | |
| A | .350 | 5622 | +1330 |
| B | .490 | LOOSE | — |
| C | .380 | 3551 | +797 |
| D | .360 | 4981 | +1053 |
| E | .485 | LOOSE | — |
| F | .335 | 6500 | +1519 |
| APPLIED LOAD: 30,000 | | | |
| A | .335 | 6500 | +878 |
| B | .520 | LOOSE | — |
| C | .345 | 5925 | +2374 |
| D | .335 | 6500 | +1519 |
| E | .500 | LOOSE | — |
| F | .320 | 7290 | +790 |
| APPLIED LOAD: 35,000 | | | |
| A | .325 | 7036 | +536 |
| B | .535 | LOOSE | — |
| C | .325 | 7036 | +1111 |
| D | .325 | 7036 | +536 |
| E | .535 | LOOSE | — |
| F | .305 | 8001 | +711 |

Referring to FIG. 2, the stiff springs of spring assemblies 180-190 of the test assembly each had an outer diameter of 6.500 inches and an inner diameter of 3.922 inches, a thickness of 0.2200 inch, a dish height of 0.2000 inch and a maximum load capacity of 11,140 pounds.

The soft spring assemblies 180-190 of the test assembly each had an outer diameter of 6.500 inches an inner diameter of 3.922 inches, a thickness of 0.1000 inches, a dish height of 0.1750 inches and a maximum load capacity of 1000 pounds.

As previously noted in the description of FIG. 2, spring assemblies 180, 184, 186 and 190 were oriented to distribute upwardly directed loads, while spring assemblies 182 and 188 were oriented to distribute downwardly directed loads.

TABLE II

| SPRING | HEIGHT | LOAD | |
|---|---|---|---|
| APPLIED LOAD: 0 | | | |
| 180 | 1.480 | 1000 | |
| 182 | .667 | 823 | |
| 184 | 1.458 | 2154 | |
| 186 | 1.462 | 1775 | |
| 188 | .690 | 833 | |
| 190 | 1.430 | 4669 | |

| SPRING | HEIGHT | LOAD | Δ LOAD |
|---|---|---|---|
| APPLIED LOAD: 5,000 | | | |
| 180 | 1.475 | 1000 | — |
| 182 | .669 | 824 | — |
| 184 | 1.456 | 2342 | +188 |
| 186 | 1.454 | 2529 | +754 |
| 188 | .694 | 836 | — |
| 190 | 1.425 | 5092 | +423 |
| APPLIED LOAD: 10,000 | | | |
| 180 | 1.465 | 1486 | +486 |
| 182 | .680 | 829 | — |
| 184 | 1.450 | 2898 | +556 |
| 186 | 1.450 | 2898 | +369 |
| 188 | .704 | 840 | — |
| 190 | 1.414 | 5998 | +906 |
| APPLIED LOAD: 15,000 | | | |
| 180 | 1.460 | 1965 | +479 |
| 182 | .689 | 833 | — |
| 184 | 1.440 | 3799 | +901 |
| 186 | 1.438 | 3975 | +1077 |
| 188 | .713 | 845 | — |
| 190 | 1.407 | 6556 | +558 |

TABLE II-continued

| APPLIED LOAD: 20,000 | | | |
|---|---|---|---|
| 180 | 1.447 | 3171 | +1206 |
| 182 | .698 | 835 | — |
| 184 | 1.428 | 4839 | +1040 |
| 186 | 1.425 | 5092 | +1117 |
| 188 | .723 | 851 | — |
| 190 | 1.392 | 7707 | +1151 |
| APPLIED LOAD: 25,000 | | | |
| 180 | 1.434 | 4325 | +1154 |
| 182 | .711 | 844 | — |
| 184 | 1.417 | 5755 | +916 |
| 186 | 1.412 | 6159 | +1067 |
| 188 | .736 | 858 | — |
| 190 | 1.379 | 8654 | +947 |
| APPLIED LOAD: 30,000 | | | |
| 180 | 1.422 | 5343 | +1018 |
| 182 | .723 | 851 | — |
| 184 | 1.406 | 6635 | +880 |
| 186 | 1.402 | 6947 | +788 |
| 188 | .748 | 866 | — |
| 190 | 1.366 | 9559 | +905 |
| APPLIED LOAD: 35,000 | | | |
| 180 | 1.407 | 6556 | +1213 |
| 182 | 1.739 | 861 | — |
| 184 | 1.389 | 7930 | +1295 |
| 186 | 1.387 | 8077 | +1130 |
| 188 | .763 | 875 | — |
| 190 | 1.350 | 10,614 | +1055 |
| APPLIED LOAD: 40,000 | | | |
| 180 | 1.393 | 7632 | +1076 |
| 182 | .752 | 869 | — |
| 184 | 1.375 | 8937 | +1007 |
| 186 | 1.372 | 9147 | +1070 |
| 188 | .779 | 887 | — |
| 190 | 1.335 | 11,550 | +936 |
| APPLIED LOAD: 45,000 | | | |
| 180 | 1.376 | 8867 | +1235 |
| 182 | .767 | 878 | — |
| 184 | 1.355 | 10,291 | +1354 |
| 186 | 1.353 | 10,421 | +1274 |
| 188 | .793 | 896 | — |
| 190 | 1.317 | 12,608 | +1058 |
| APPLIED LOAD: 50,000 | | | |
| 180 | 1.360 | 9962 | +1095 |
| 182 | .784 | 890 | — |
| 184 | 1.342 | 11,120 | +829 |
| 186 | 1.336 | 11,489 | +1068 |
| 188 | .811 | 909 | — |
| 190 | 1.300 | 13,546 | +938 |
| APPLIED LOAD: 55,000 | | | |
| 180 | 1.346 | 10,869 | +907 |
| 182 | .801 | 901 | — |
| 184 | 1.326 | 12,087 | +967 |
| 186 | 1.320 | 12,436 | +947 |
| 188 | .827 | 920 | — |
| 190 | 1.284 | 14,378 | +832 |
| APPLIED LOAD: 75,000 | | | |
| 180 | 1.250 | 16,003 | +5134 |
| 182 | .889 | 962 | — |
| 184 | 1.231 | 16,834 | +4747 |
| 186 | 1.225 | 17,087 | +4651 |
| 188 | .910 | 974 | — |
| 190 | 1.187 | 18,590 | +4212 |

The test results set forth above in Tables I and II demonstrate that:

1) in the bearing assembly of the '675 patent, springs, balls and race members oriented opposite the loading direction remain loose during loading;

2) in the bearing assembly of the present invention the spring assemblies oriented opposite the loading direction maintain their associated balls and race members under a preload at rest and during loading;

3) increased loads are distributed unevenly on the components of the bearing assembly of the '675 patent and after initial settling, 4) increases in load are distributed relatively evenly over the components of the bearing assembly of the present invention.

EXAMPLE 2

A drilling motor incorporating the bearing assembly used in Example 1 was field tested. The motor has run for 38 hours at 22,000 pounds weight on bit (WOB). The motor was then disassembled and inspected revealing that all components of the bearing assembly were found to be in very good condition. The motor was built up again using the same components and run for 27 hours at 25,000 pounds WOB. The motor was then disassembled and inspected. The balls of the bearing assembly showed some indication of wear, while all other components of the bearing assembly remained in very good condition. The motor was built up again using a new set of balls and all of the other original components.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A bearing assembly for a downhole drilling motor, said motor including an axially extending tubular housing and drive shaft mounted within the housing, comprising:
   a stationary race member disposed between the housing and the drive shaft and secured to the housing;
   a displaceable race member disposed between the housing and the drive shaft;
   ball means, disposed between the stationary race member and the displaceable race member, for allowing rotation of the displaceable race member relative to the stationary race members;
   resilient load carrying means for distributing axially directed loading from the drive shaft to the displaceable race member; and
   resilient preload means for maintaining an axially directed preload on the displaceable race member to maintain the ball means in contact with the displaceable race member and the stationary race member.

2. The bearing assembly of claim 1, wherein the assembly allows both rotational and bidirectional axial movement of the drive shaft within the housing.

3. The assembly of claim 1, further comprising:
   a spacer ring member secured to the drive shaft, wherein said load carrying means and said preload means are disposed between the spacer ring and the displaceable race member.

4. The assembly of claim 1, further comprising:
   inner sleeve means for allowing displacement of the displaceable race member relative to the drive shaft; and
   outer sleeve means for allowing displacement of the displaceable race member relative to the housing.

5. The bearing assembly of claim 1, wherein the preload means maintains the preload in the absence of an externally applied axial thrust load.

6. The bearing assembly of claim 5, wherein the preload means maintains the preload when the spacer ring is displaced away from the displaceable race member.

7. The bearing assembly of claim 1, wherein resilient load carrying means comprises one or more stiff Belleville springs and the resilient preload means comprises one or more soft Belleville springs.

8. The bearing assembly of claim 7, wherein the load carrying means is substantially extended and the preload means is substantially compressed when the assembly is at rest.

9. The bearing assembly of claim 7, wherein the stiff spring exhibits a stiffness of greater than about 20,000 lb/in and the soft spring exhibits a stiffness of less than 10,000 lb/in.

10. The bearing assembly of claim 7, wherein the stiff spring exhibits a maximum load capacity of about 2000 pounds or greater and the soft spring exhibits a maximum load capacity of about 1000 pounds or less.

11. The bearing assembly of claim 7, wherein the soft spring exhibits a maximum load capacity of about 300 pounds.

12. The bearing assembly of claim 7, wherein the resilient load carrying means comprises two opposed stacks of stiff Belleville springs and each stack comprises a plurality of Belleville springs stacked in parallel.

13. A bearing assembly for a downhole drilling motor, said motor including a tubular housing, said housing extending axially from a top end to a bottom end and a drive shaft mounted within the housing, comprising:
   a stationary race member disposed between the housing and the shaft and secured within the housing;
   a first displaceable race member disposed between the housing and the shaft and above the stationary race member,
   a second displaceable race member disposed between the housing and the shaft and below the stationary race member;
   first ball means, disposed between the stationary race member and the first displaceable race member for allowing rotation of the first displaceable race member relative to the stationary race member,
   second ball means, disposed between the stationary race member and the second displaceable race member, for allowing rotation of the second displaceable race member relative to the stationary race member;
   first resilient load carrying means for distributing downwardly directed axial loading from the drive shaft to the first displaceable race member;
   second resilient load carrying means for distributing upwardly directed axial loading from the drive shaft to the second displaceable race members;
   first resilient preload means for maintaining a downwardly directed axial preload on the first displaceable race member; and
   second resilient preload means for maintaining an upwardly directed axial preload on the second displaceable race member.

14. The bearing assembly of claim 13, wherein the assembly allows both rotational and bidirectional axial movement of the drive shaft within the housing.

15. The bearing assembly of claim 13, wherein the race members each include respective top and bottom surfaces and ball receiving race means are defined on the top and bottom surfaces of the stationary race member, on the bottom surface of the first displaceable race member and on the top surface of the second displaceable race member.

16. The bearing assembly of claim 13, further comprising:

inner sleeve means for allowing displacement of the displaceable race members relative to the drive shaft, first outer sleeve means for allowing displacement of the first displaceable race member relative to the housing; and second outer sleeve means for allowing displacement of the second displaceable race member relative to the housing.

17. The bearing assembly of claim 13, further comprising:
- a first spacer ring member disposed between the housing and the shaft, above the first displaceable ring member and secured to the drive shaft; and
- wherein the first load carrying means and the first preload means are disposed between the first spacer ring member and the first displaceable race member; and
- a second spacer ring member disposed below the second displaceable race member and secured to the drive shaft,
- wherein the second load carrying means and the second preload means are disposed between the second space ring member and the second displaceable race member.

18. The bearing assembly of claim 16, wherein the first and second load carrying means each comprise one or more stiff Belleville springs and the first and second preload means each comprise one or more soft Belleville spring.

19. The bearing assembly of claim 18, wherein the stiff springs are substantially extended and the soft springs are substantially compressed when the assembly is at rest.

20. The bearing assembly of claim 18, wherein the one or more stiff springs of the first load carrying means exhibit a first stiff spring extended overall height when fully extended and the one or more soft springs of the second preload means exhibit a second soft spring extended overall height when fully extended and wherein the second soft spring extended overall height is greater than the first stiff spring extended overall height.

21. The bearing assembly of claim 18, wherein the one or more stiff springs of the second load carrying means exhibit a second stiff spring extended overall height when fully extended and the one or more soft springs of the first preload means exhibit a first soft spring extended height when fully extended and wherein the first soft spring extended overall height is greater than the second stiff spring extended overall height.

22. The bearing means of claim 18, wherein each of the stiff springs exhibits a stiffness of about 20,000 lb/in or greater and the each of the soft springs exhibits a stiffness of less than 10,000 lb/in.

23. The bearing means of claim 18, wherein each of the stiff springs exhibts a maximum load capacity of about 2000 pounds or greater and each of the soft springs exhibits a maximum load capacity of about 1000 pounds or less.

24. The bearing assembly of claim 23, wherein each of the soft springs exhibits a maximum load capacity of about 300 pounds.

25. The bearing assembly of claim 16, wherein the second load carrying means comprises two opposed spring stacks and each stack comprises a plurality of stiff Belleville springs stacked in parallel.

26. The bearing assembly of claim 16, wherein the first and second preload means each comprise a plurality of soft Belleville springs stacked in series.

27. The bearing assembly of claim 13, wherein the assembly provides improved durability by reducing shock loading on the components of the bearing assembly during changes in the direction and magnitude of axial loading on the drive shaft.

28. A bearing assembly for a downhole drilling motor, said motor including an axially extending tubular housing and a drive shaft mounted within the housing, comprising:
- a first stationary race member disposed between the housing and the drive shaft and secured to the housing;
- a fist displaceable race member disposed between the housing and the drive shaft and below said stationary race member;
- first ball means, disposed between the first stationary race member and the first stationary race member, for allowing rotation of the first displaceable race member relative to the first stationary race member;
- first resilient load carrying means for distributing upwardly directed axial loading from the drive shaft to the first displaceable race members;
- a second stationary race member disposed between the housing and the drive shaft and secured to the housing;
- a second displaceable race member disposed between the housing and the drive shaft and below the second stationary race member;
- second ball means disposed between the second stationary race member and the second displaceable race member for allowing rotation of the displaceable race member relative to the stationary race member;
- second resilient load carrying means for distributing upwardly directed axial loading from the drive shaft to the second displaceable race member;
- wherein said first and second resilient load carrying means each comprise two opposed stacks of Belleville springs, each stack comprising a plurality of Belleville spring stacked in parallel, wherein the first and second load carrying means allow the upwardly directed axial load to be evenly shared by the first and second race members and ball means.

29. The bearing assembly of claim 28, wherein each of the springs exhibits a maximum load capacity of about 2000 pounds or greater.

30. The bearing assembly of claim 28, wherein each of the springs exhibits a maximum deflection of about 0.100 inch or greater.

* * * * *

UNITED STATES PATENT AND TRADEMARK OFFICE
CERTIFICATE OF CORRECTION

PATENT NO. : 5,074,681

DATED : December 24, 1991

INVENTOR(S) : William E. Turner, et al

It is certified that error appears in the above-identified patent and that said Letters Patent is hereby corrected as shown below:

Col. 2, line 1, Before the paragraph beginning "An alternative embodiment of the bearing assembly", insert the following paragraph: -- In a preferred embodiment, the resilient preload means comprises one or more Belleville springs wherein each Belleville spring has a load carrying capacity of about 1000 pounds or less.--

Signed and Sealed this

Third Day of May, 1994

Attest:

BRUCE LEHMAN

Attesting Officer   Commissioner of Patents and Trademarks